(12) United States Patent
Kawaguchi

(10) Patent No.: US 7,473,042 B2
(45) Date of Patent: Jan. 6, 2009

(54) LIGHT-AMOUNT ADJUSTING APPARATUS

(75) Inventor: Koji Kawaguchi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 596 days.

(21) Appl. No.: 11/148,338

(22) Filed: Jun. 9, 2005

(65) Prior Publication Data

US 2005/0226611 A1   Oct. 13, 2005

(51) Int. Cl.
    *G03B 9/04*   (2006.01)
(52) U.S. Cl. ...................... 396/450; 396/505
(58) Field of Classification Search .................. 396/63, 396/64, 65, 98, 170, 257, 449, 450, 458, 396/461, 505, 507, 509; 352/141, 45; 348/199, 348/363, 362; 359/739, 894, 722–723, 694, 359/699–700, 738
    See application file for complete search history.

(56) References Cited

U.S. PATENT DOCUMENTS

| | | | | |
|---|---|---|---|---|
| 5,293,542 A | * | 3/1994 | Ise et al. | 348/363 |
| 5,646,770 A | * | 7/1997 | Sato et al. | 359/230 |
| 5,907,733 A | * | 5/1999 | Hara et al. | 396/505 |
| 6,533,473 B1 | * | 3/2003 | Edamitsu et al. | 396/450 |
| 6,779,933 B2 | * | 8/2004 | Sato et al. | 396/463 |
| 6,924,941 B2 | * | 8/2005 | Okada et al. | 359/698 |
| 2003/0161626 A1 | * | 8/2003 | Namazue et al. | 396/505 |
| 2004/0240879 A1 | * | 12/2004 | Negishi et al. | 396/505 |
| 2005/0058444 A1 | * | 3/2005 | Watanabe et al. | 396/458 |
| 2005/0073604 A1 | * | 4/2005 | Umezu | 348/363 |
| 2005/0238348 A1 | * | 10/2005 | Oh | 396/451 |

FOREIGN PATENT DOCUMENTS

| | | |
|---|---|---|
| JP | 08-043878 A | 2/1996 |
| JP | 2001-272709 A | 10/2001 |
| JP | 2002-014384 A | 1/2002 |
| JP | 2004-205557 A | 7/2004 |

* cited by examiner

*Primary Examiner*—W. B. Perkey
*Assistant Examiner*—Fang-Chi Chang
(74) *Attorney, Agent, or Firm*—Foley & Lardner LLP

(57) ABSTRACT

A light-amount adjusting apparatus includes two aperture diaphragms that move in such a direction that the two aperture diaphragms come close or get away with respect to an optical axis of an incident light to adjust a size of an aperture opening. At least one of the two aperture diaphragms includes an optical filter having a predetermined light transmittance characteristic. The optical filter freely advances and retreats in a direction of the aperture opening in conjunction with a movement of the aperture diaphragm.

29 Claims, 15 Drawing Sheets

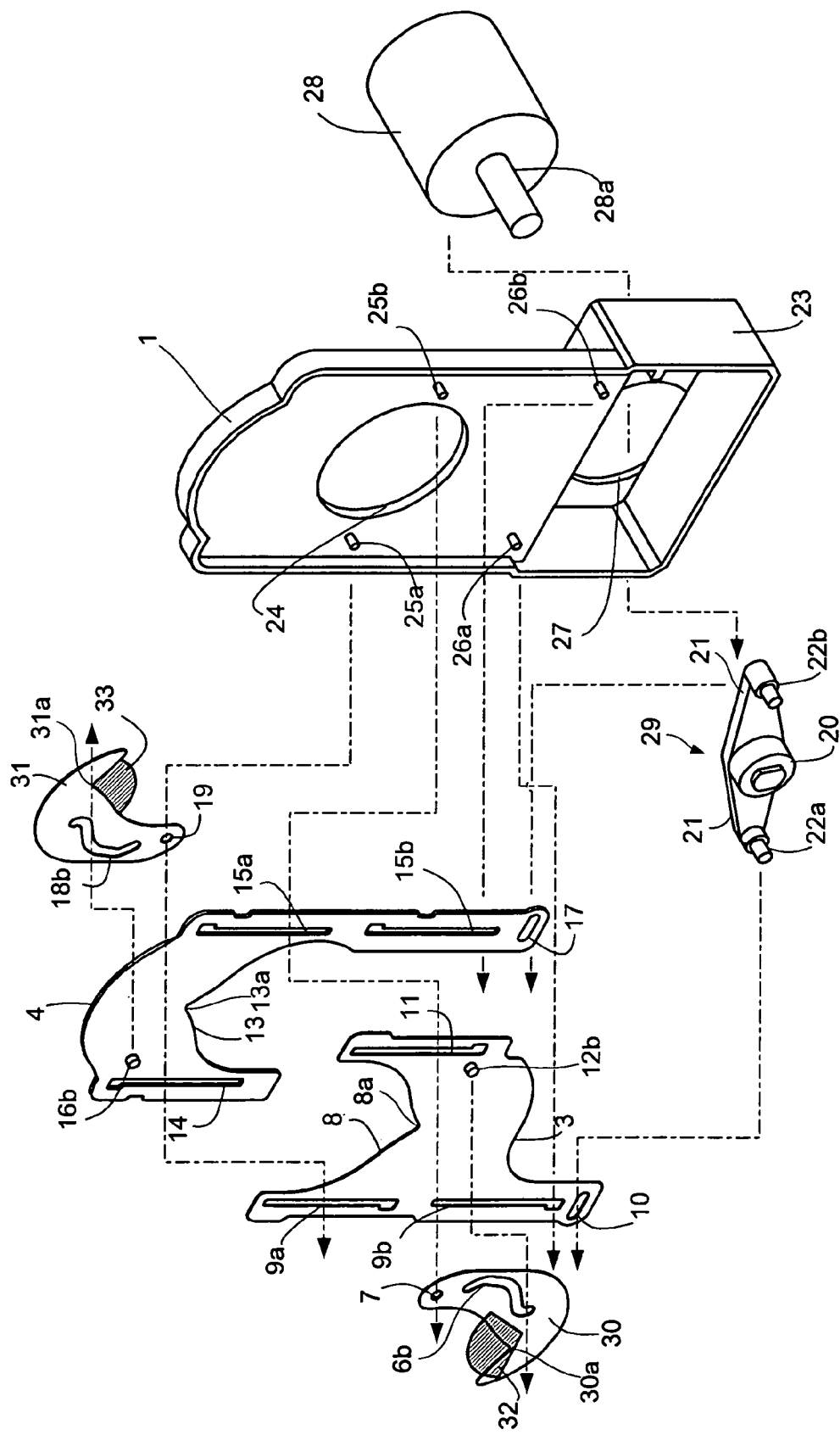

LIGHT-AMOUNT ADJUSTING APPARATUS

BACKGROUND OF THE INVENTION

1) Field of the Invention

The present invention relates to a light-amount adjusting apparatus used in an optical system of an imaging apparatus such as a video camera.

2) Description of the Related Art

As a light-amount adjusting apparatus according to a conventional technology, to be used in an optical system in an imaging apparatus such as a video camera, there is a device wherein adjusting light amount, in consideration of reduction of resolution deterioration owing to light diffraction, an ND filter and an aperture diaphragm are operated (see, for example, Japan Patent Application Publication No.2002-14384). In this device, as the illuminance of an object changes to low illuminance, middle illuminance, and high illuminance, the ND filter and the aperture diaphragm are driven independently, and light-amount adjustment is carried out. Further, there is a device where an ND filter is attached to two aperture diaphragms, and the ND filter is structured so that light transmittance should become lower from the center of light axis toward the outside in radial direction (see, for example, Japan Patent Application Publication No.8-43878). Furthermore, there is a device where an aperture opening is formed by aperture diaphragms moving on a plane perpendicular to light axis in the direction in which the aperture diaphragms become away from each other, and an ND filter having at least 2 stages of light transmittance is attached to an aperture diaphragm (see, for example, Japan Patent Application Publication No.2001-272709).

However, in the devices disclosed in the above literatures, part of the ND filter is left in the light path even at the maximum aperture (maximum opening) of the aperture diaphragms, accordingly even at the maximum aperture, light going through the opening is subject to influence of the ND filter, and sufficient light amount cannot be obtained.

Further, in the device disclosed in Japan Patent Application Publication No.2001-272709, the opening and closing mechanism of aperture diaphragms is structured so as to move in the same direction (vertical direction) as the moving frame mechanism of the ND filter. Further, the aperture and the ND filter are driven in two stages in vertical direction, accordingly the device is long in vertical direction and the size thereof is large. Furthermore, the opening and closing mechanism of aperture diaphragms and the moving frame mechanism of ND filter are driven by different driving motors, and the respective driving motors are arranged in the front and rear of the device, accordingly the device is large in the anteroposterior direction.

SUMMARY OF THE INVENTION

It is an object of the present invention to solve at least the above problems in the conventional technology.

A light-amount adjusting apparatus according to one aspect of the present invention includes two aperture diaphragms that move in such a direction that the two aperture diaphragms come close or get away with respect to an optical axis of an incident light to adjust a size of an aperture opening. At least one of the two aperture diaphragms includes an optical filter having a predetermined light transmittance characteristic. The optical filter freely advances and retreats in a direction of the aperture opening in conjunction with a movement of the aperture diaphragm.

A light-amount adjusting apparatus according to another aspect of the present invention includes two aperture diaphragms that move in such a direction that the two aperture diaphragms come close or get away with respect to an optical axis of an incident light to adjust a size of an aperture opening; a moving unit that moves the aperture diaphragms; and an optical filter that freely advances and retreats in a direction of the aperture opening in conjunction with a movement of the aperture diaphragm by the moving unit, and has a predetermined light transmittance in the direction of the aperture opening.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a disassembled perspective view showing the structure of a light-amount adjusting apparatus according to a third embodiment of the present invention;

DETAILED DESCRIPTION

Exemplary embodiments of a light-amount adjusting apparatus according to the present invention will be explained in detail with reference to the accompanying drawings. A light-amount adjusting apparatus according to the present invention is one where aperture diaphragms and optical filters move on a plane perpendicular to the light axis, thereby its opening area (aperture opening) is changed. The explanations hereinafter are described on assumption that directions of respective components are viewed from an object in front of a light-amount adjusting apparatus.

Figure 1:
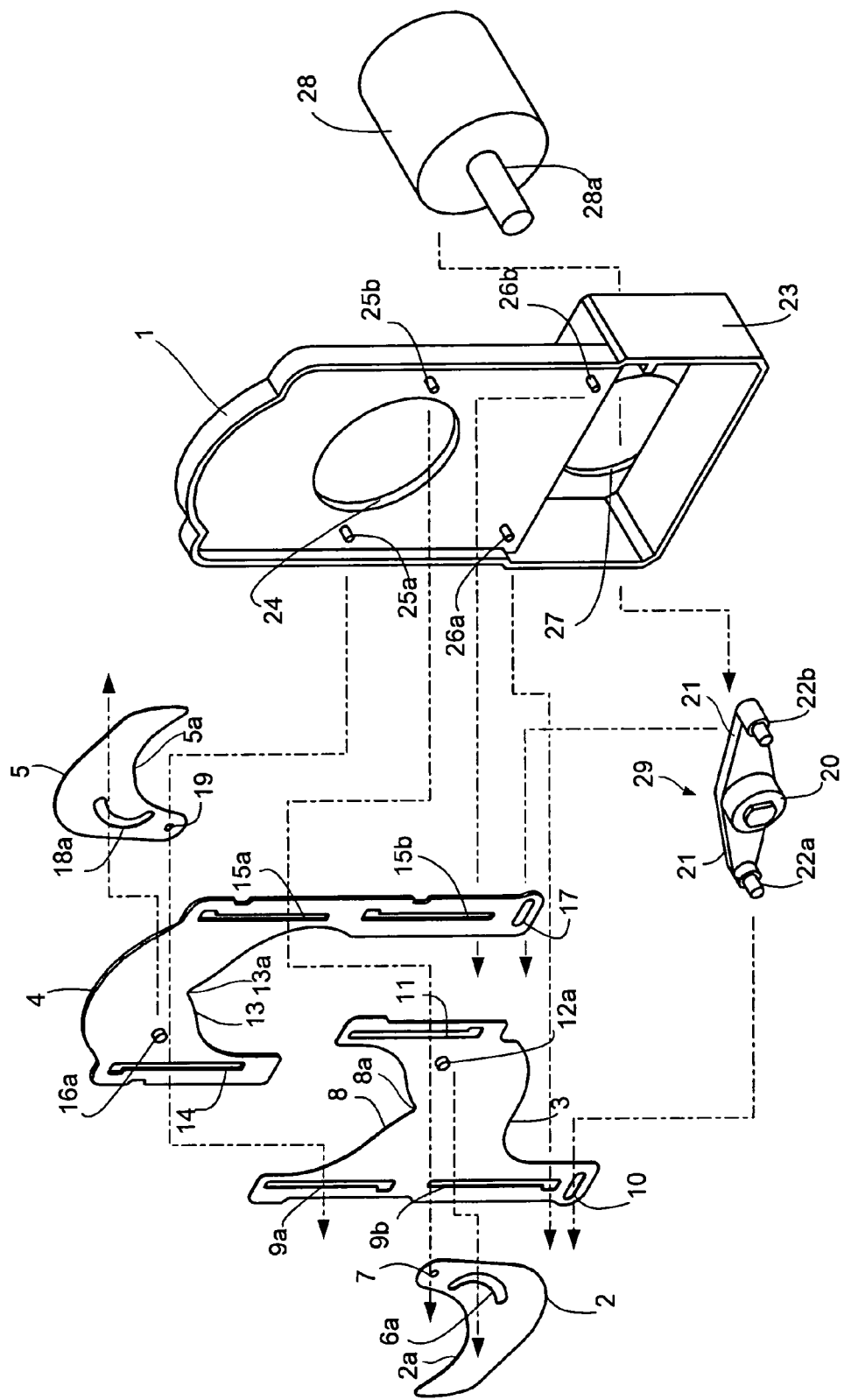
FIG. 1 is a disassembled perspective view showing the structure of a light-amount adjusting apparatus according to a first embodiment of the present invention.

FIG. 1 is a disassembled perspective view showing the structure of a light-amount adjusting apparatus according to a first embodiment of the present invention. The light-amount adjusting apparatus according to the first embodiment includes an aperture holder 1, a lower optical filter 2, a lower aperture diaphragm 3, an upper aperture diaphragm 4, an upper optical filter 5, a driving motor 28, and a driving unit 29.

At the position above the roughly center of the aperture holder 1, a roughly circular light pass hole 24 is formed. At the lower portion of the aperture holder 1, a driving attaching portion 23 for attaching the driving motor 28 is arranged. In the driving attaching portion 23, a roughly circular driving motor attaching portion 27 is formed. Further, on both the sides of the light pass hole 24, two rotating shafts (diaphragm guide pins) 25a and 25b are formed to protrude toward the front in the figure (object side). On the upper left and right sides of the driving attaching portion 23, two diaphragm guide pins 26a and 26b are formed to protrude toward the object side.

The lower optical filter 2 is formed of an ND filter having a specified light transmittance characteristic, and is of a bow shape, and has an internal circumference 2a that roughly meets the shape of the light pass hole 24. Further, in the roughly center of the lower optical filter 2, a cam hole 6a that is cut into an arc shape is formed, and in the upper end portion, a rotation center hole 7 is formed.

The lower aperture diaphragm 3 is of a shape whose lower roughly right half is cut out, and in the upper portion thereof, a roughly semi circular opening forming portion 8 that roughly meets the shape of the light pass hole 24 is formed. In the opening forming portion 8, both the sides thereof are smoothly circular first toward the lower side, and the width thereof becomes sharply narrow at the center and the most lower end portion 8a is downwardly convex.

Further, in the left end of the lower aperture diaphragm 3, vertically long straight guide holes 9a and 9b are formed. The straight guide holes 9a and 9b are same in size and shape, and the straight guide hole 9b is formed just under the straight guide hole 9a. Under the straight guide hole 9b, in the lower end portion of the lower aperture diaphragm 3, a horizontally long rotation connection hole 10 is formed. On the other hand, in the right end of the lower aperture diaphragm 3, a vertically long straight guide hole 11 is formed. The size and shape of the straight guide hole 11 are same as those of the straight guide hole 9a, and is axisymmetric with the straight guide hole 9a to the center line of the lower aperture diaphragm 3. In the left side of the straight guide hole 11, a driving shaft 12a is formed to protrude forward (to the object side).

The upper aperture diaphragm 4 is of a shape whose lower roughly left half is cut out, and in the center portion thereof, a roughly semi circular opening forming portion 13 that roughly meets the shape of the light pass hole 24 is formed. In the opening forming portion 13, both the sides thereof are smoothly circular first toward the upper side, and the width thereof becomes sharply narrow at the center and the most upper end portion 13a is upwardly convex.

Further, in the right end of the upper aperture diaphragm 4, vertically long straight guide holes 15a and 15b are formed. The straight guide holes 15a and 15b are same in size and shape, and the straight guide hole 15b is formed just under the straight guide hole 15a. In the lower end portion of the upper aperture diaphragm 4, under the straight guide hole 15b, a horizontally long rotation connection hole 17 is formed. On the other hand, in the left end of the upper aperture diaphragm 4, a vertically long straight guide hole 14 is formed. The size and shape of the straight guide hole 14 are same as those of the straight guide hole 15a, and is axisymmetric with the straight guide hole 15a to the center line of the upper aperture diaphragm 4. In the right side of the straight guide hole 14, a driving shaft 16a is formed to protrude backward (to the image side).

The upper optical filter 5 is formed of a ND filter having a specified light transmittance characteristic, and is of a bow shape, and has an internal circumference 5a that roughly meets the shape of the light pass hole 24. Further, in the roughly center of the upper optical filter 5, a cam hole 18a that is cut into an arc shape is formed, and in the lower end portion, a rotation center hole 19 is formed. The shape of the upper optical filter 5 is same as that of the lower optical filter 2, and the light transmittance thereof is also same. Further, the sizes, shapes and formation positions of the cam hole 18a and the rotation center hole 19 are same as those of the cam hole 6a and the rotation center hole 7.

As the raw material of the lower aperture diaphragm 3 and the upper aperture diaphragm 4, a thin film that blocks out light is employed.

The driving unit 29 comprises a rotation lever 20 at the center, an arm 21 that expands horizontally from the rotation level 20, a left connection pin 22a and a right connection pin 22b that are arranged respectively at the left and right ends of the arm 21. By the way, the left connection pin 22a and the right connection pin 22b are formed to protrude forward (to the object side).

In this light-amount adjusting apparatus, from not illustrated object side (left side of the figure), the lower optical filter 2, the lower aperture diaphragm 3, the upper aperture diaphragm 4, and the upper optical filter 5 are arranged sequentially.

To the driving shaft 12a arranged on the lower aperture diaphragm 3, the cam hole 6a of the lower optical filter 2 is engaged. Further, to the driving shaft 16a arranged on the upper aperture diaphragm 4, the cam hole 18a of the upper optical filter 5 is engaged. Then, to the rotating shaft 25a on the aperture holder 1, the rotation center hole 19 in the upper optical filter 5 is engaged, further, the straight guide hole 14 in the upper aperture diaphragm 4, and the straight guide hole 9a of the lower aperture diaphragm 3 are engaged.

Meanwhile, to the rotating shaft 25b on the aperture holder 1, the straight guide hole 15a of the upper aperture diaphragm 4, and the straight guide hole 11 of the lower aperture diaphragm 3 are engaged, and further, the rotation center hole 7 of the lower optical filter 2 is engaged. To the diaphragm guide pin 26a of the aperture holder 1, the straight guide hole 9b of the lower aperture diaphragm 3 is engaged. To the diaphragm guide pin 26b of the aperture holder 1, the straight guide hole 15b of the upper aperture diaphragm 4 is engaged. Thereby, the lower optical filter 2 and the upper optical filter 5 are arranged point symmetrically to the center (light axis) of the light pass hole 24 of the aperture holder 1.

Further, from the rear side (image side) of the driving attaching portion 23, the driving motor 28 is attached to the driving motor attaching portion 27 arranged in the driving attaching portion 23. Then, the rotating shaft 28a of the driving motor 28 is attached to the rotation lever 20 of the driving unit 29. The left connection pin 22a and the right connection pin 22b arranged at both the ends of the arm 21 of the driving unit 29 are engaged to the rotation connection hole 10 of the lower aperture diaphragm 3 and the rotation connection hole 17 of the upper aperture diaphragm 4 respectively. The left connection pin 22a and the right connection pin 22b freely slide to the rotation connection hole 10 and the rotation connection hole 17 respectively.

When the driving motor 28 is driven (rotated), the arm 21 of the driving unit 29 swings. At this moment, the left connection pin 22a and the right connection pin 22b of the arm 21 move in mutually reverse vertical directions, thereby, the lower aperture diaphragm 3 and the upper aperture diaphragm 4 move in mutually reverse vertical directions. Accordingly, the lower optical filter 2 and the upper optical filter 5 respectively arranged on the lower aperture diaphragm 3 and the upper aperture diaphragm 4 move in mutually reverse vertical directions, too.

The driving shaft 16a of the upper aperture diaphragm 4 slides in the cam hole 18a formed in the upper optical filter 5, and the upper optical filter 5 rotates around the rotation center hole 19. At the same time, the driving shaft 12a of the lower aperture diaphragm 3 slides in the cam hole 6a formed in the lower optical filter 2, and the lower optical filter 2 rotates around the rotation center hole 7. The lower optical filter 2 and the upper optical filter 5 rotate, while holding their point symmetrical conditions to the center of the light pass hole 24. Through these actions, the size of an aperture opening (opening area 40 to be explained hereinafter) to be formed in the light pass hole 24 portion of the light-amount adjusting apparatus changes.

Figure 2:
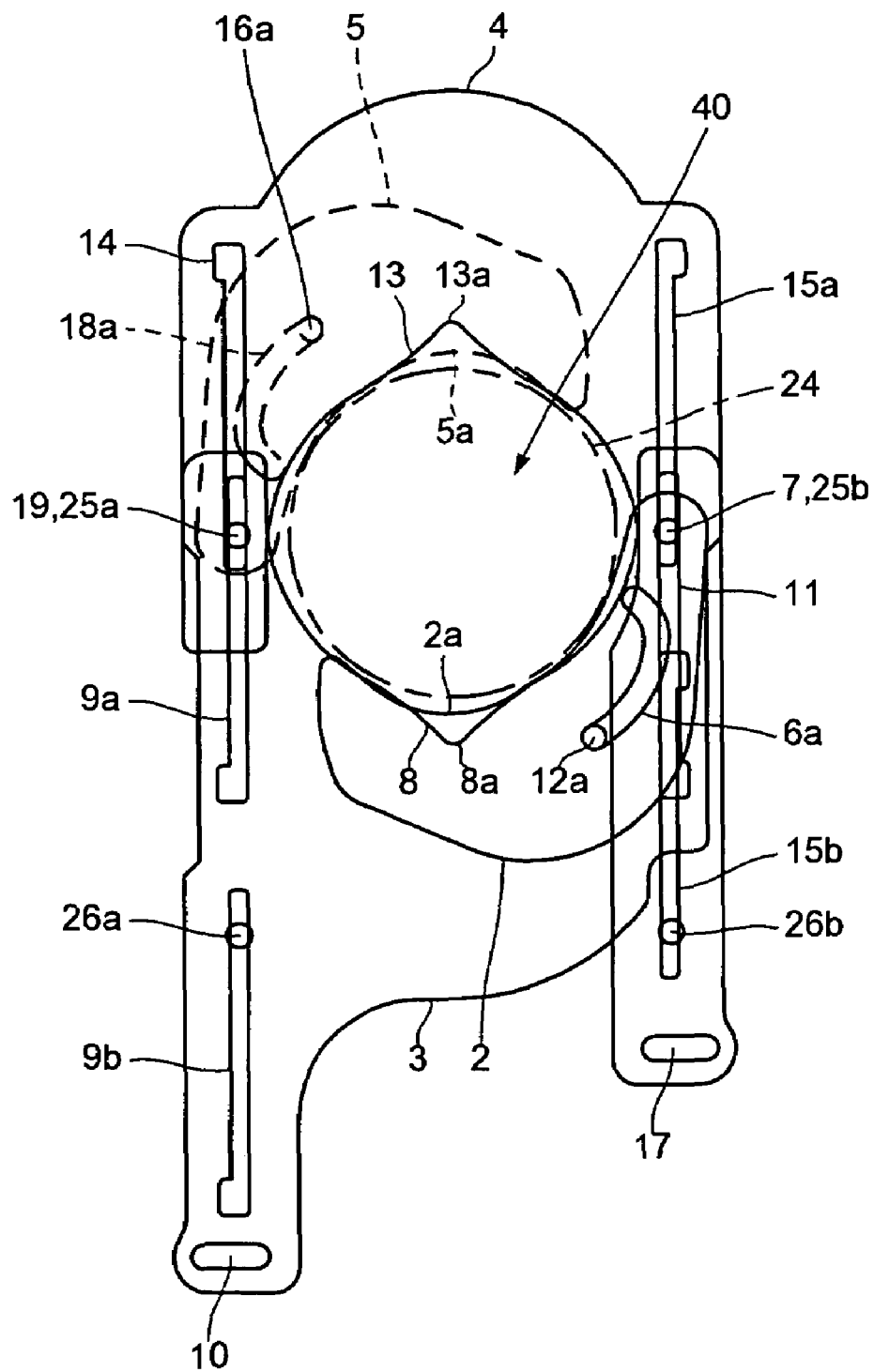
FIG. 2 is a front view of the light-amount adjusting apparatus according to the first embodiment.

FIG. 2 is a front view of the light-amount adjusting apparatus according to the first embodiment. The maximum aperture condition (aperture release) is shown in the figure. At the moment of this maximum aperture, the left connection pin 22a of the arm 21 of the driving unit 29 shown in FIG. 1 is positioned diagonally downward, and the right connection pin 22b is positioned diagonally upward. Accordingly, the lower aperture diaphragm 3 is positioned at the lower end of the move range thereof, and the upper aperture diaphragm 4 is positioned at the upper end of the move range thereof.

The opening forming portion 8 of the lower aperture diaphragm 3 and the opening forming portion 13 of the upper aperture diaphragm 4 nearly overlap the light pass hole 24 of the aperture holder 1, and do not get into the light pass hole 24. Further, the most lower end portion 8a of the opening forming portion 8 of the lower aperture diaphragm 3 and the most upper end portion 13a of the opening forming portion 13 of the upper aperture diaphragm 4, that are convex, are outside of the light pass hole 24 of the aperture holder 1. Further, at this maximum aperture, the lower optical filter 2 and the upper optical filter 5 are outside of the light pass hole 24, therefore, light that is guided to an imaging element (not illustrated) to be arranged at the rear of the device is free of influence by the lower optical filter 2 and the upper optical filter 5. The size of an opening area 40 to be formed by the lower aperture diaphragm 3, and the opening forming portions 8 and 13 of the upper aperture diaphragm 4 changes continuously as the lower aperture diaphragm 3 and the upper aperture diaphragm 4 move. Further, as the lower aperture diaphragm 3 and the upper aperture diaphragm 4 move, the lower optical filter 2 and the upper optical filter 5 go in and out of the opening area 40.

Figure 3A:
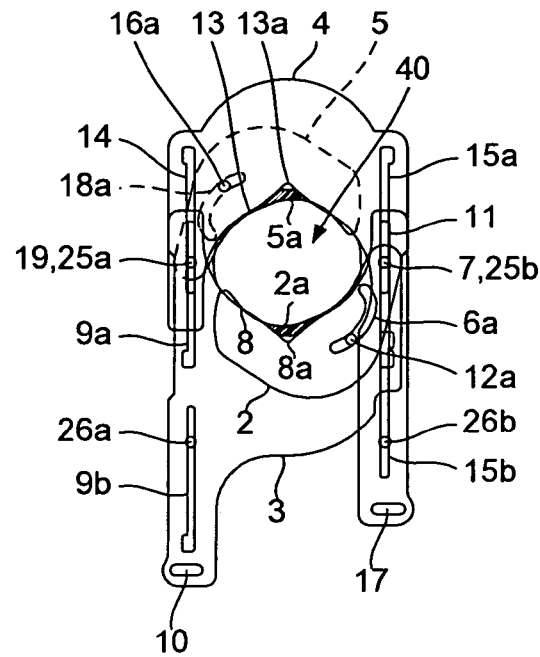
FIGS. 3A to 3D are series of action figures for explaining the aperture actions of the light-amount adjusting apparatus according to the first embodiment.

FIGS. 3A to 3D show action figures for explaining the aperture actions of the light-amount adjusting apparatus according to the first embodiment. FIG. 3A is a condition where the aperture is a bit stopped down from the maximum aperture condition shown in FIG. 2. In this condition, the lower aperture diaphragm 3 and the upper aperture diaphragm 4 are moved, and the most lower end portion 8a of the opening forming portion 8 of the lower aperture diaphragm 3 and the most upper end portion 13a of the opening forming portion 13 of the upper aperture diaphragm 4 are positioned a bit inside from the edge of the light pass hole 24. At this moment, as the lower aperture diaphragm 3 and the upper aperture diaphragm 4 move, the driving shafts 12a and 16a move vertically. The opening area 40 formed by the opening forming portion 8 of the lower aperture diaphragm 3 and the opening forming portion 13 of the upper aperture diaphragm 4 is positioned inside from the edge of the light pass hole 24 (Refer to FIG. 2.), and becomes a horizontally long oval shape.

Further, as for the lower optical filter 2 and the upper optical filter 5, to the rotation center holes 7 and 19 engaged with the rotating shafts 25a and 25b at their respectively fixed positions on the aperture holder 1 (Refer to FIG. 1.), the driving shafts 12a and 16a arranged on the lower aperture diaphragm 3 and the upper aperture diaphragm 4 move vertically. Accordingly, the driving shafts 12a and 16a move vertically in the engaging cam holes 6a and 18a, and the lower optical filter 2 and the upper optical filter 5 rotate around the rotation center holes 7 and 19 toward the light pass hole 24. Then, part of the lower optical filter 2 covers the most lower end portion 8a of the opening forming portion 8, and part of the upper optical filter 5 covers the most upper end portion 13a of the opening forming portion 13.

Figure 3B:
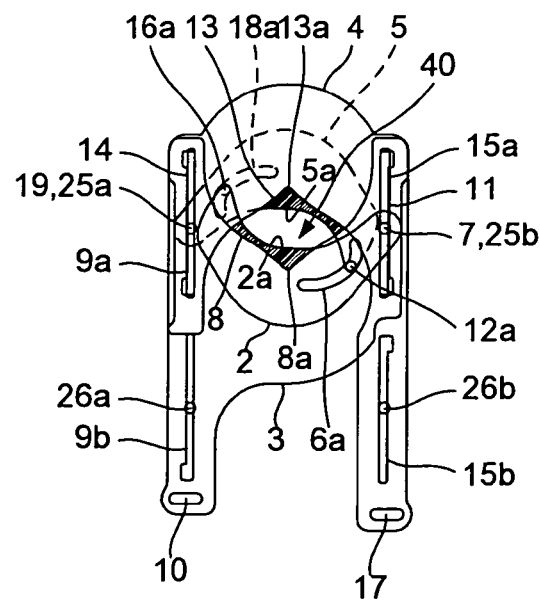

FIG. 3B is a middle aperture condition where the lower aperture diaphragm 3 and the upper aperture diaphragm 4 are moved further from the condition in FIG. 3A. The opening area 40 formed by the opening forming portion 8 of the lower aperture diaphragm 3 and the opening forming portion 13 of the upper aperture diaphragm 4 becomes a roughly rhombic shape. In this condition, the opening area 40 is positioned completely inside of the light pass hole 24. At this moment, parts of the lower optical filter 2 and the upper optical filter 5 cover about ½ of the inside of the roughly rhombic shape formed by the opening forming portions 8 and 13, and the remaining about ½ thereof lets light go through.

Figure 3C:
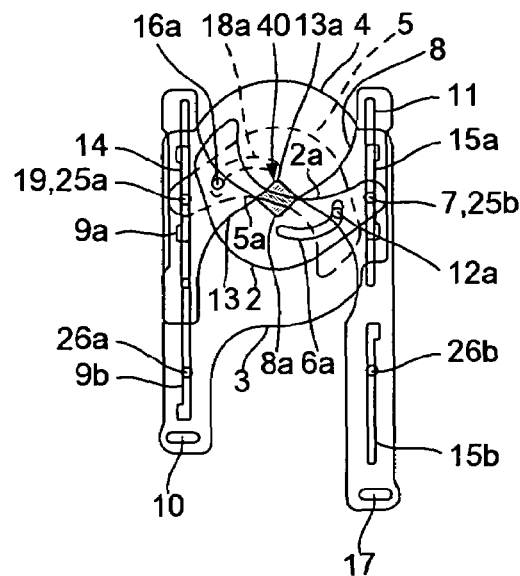

FIG. 3C is a condition where the lower aperture diaphragm 3 and the upper aperture diaphragm 4 are moved furthermore from the condition in FIG. 3B. The opening area 40 of a roughly rhombic shape formed by the opening forming portion 8 of the lower aperture diaphragm 3 and the opening forming portion 13 of the upper aperture diaphragm 4 in the area of the light pass hole 24 becomes further smaller. In this condition, in the opening area 40, the lower optical filter 2 and the upper optical filter 5 overlap, and there is no portion where light goes through. However, the lower optical filter 2 and the upper optical filter 5 do not overlap in the entire area in the opening area 40, accordingly, a portion with different light transmittance is formed in the opening area 40. As shown in the figure, the light transmittance becomes low at the center of the opening area 40, and becomes high at the peripheral portion thereof.

Figure 3D:
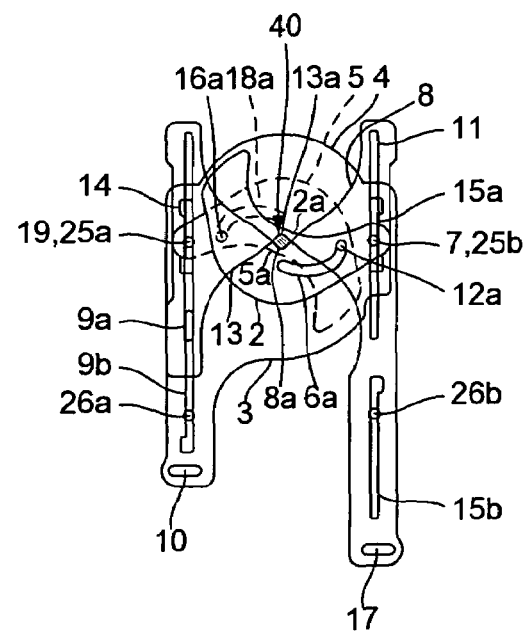

FIG. 3D is a figure showing the minimum aperture condition. At this moment, the left connection pin 22a of the arm 21 of the driving unit 29 shown in FIG. 1 is positioned diagonally upward, and the right connection pin 22b is positioned diagonally downward. Accordingly, the lower aperture diaphragm 3 is positioned at the upper end of the move range thereof, and the upper aperture diaphragm 4 is positioned at the lower end of the move range thereof. In this condition, the opening area 40 is positioned at the center of the light pass hole 24, and becomes the smallest rhombic shape. In this condition, the lower optical filter 2 and the upper optical filter 5 overlap in all the area of the opening area 40. Accordingly, the light transmittance becomes rather low. This condition is made on assumption of the case where illuminance of an object is extremely high, and enables to restrict what is called "vignetting" on an image forming plane of an imaging element.

According to the first embodiment, in the maximum aperture condition, the lower optical filter 2 and the upper optical filter 5 do not get into the light pass hole 24 as a light path, as a result, it is possible to secure sufficient light amount. Further, in this device, the lower optical filter 2 and the upper optical filter 5 rotate while holding their point symmetrical relation to the light axis, as a result, it is possible to continue (quantify) the move of the lower optical filter 2 and the upper optical filter 5, and to continuously control light amount passing the light pass hole 24 according aperture degrees.

Furthermore, according to the first embodiment, toward the minimum aperture condition, it is possible to increase the portion of the area where the lower optical filter 2 and the upper optical filter 5 overlap. Accordingly, it is possible to restrict shading that occurs especially from the middle aperture condition to the minimum aperture condition.

Moreover, according to the first embodiment, two optical filters (the lower optical filter 2 and the upper optical filter 5) are driven in connection with aperture diaphragms (the lower aperture diaphragm 3 and the upper aperture diaphragm 4), as a result, only one unit of driving motor will do well as the power source for driving them. Accordingly, it is possible to make smallest the space for arranging the power source. Further, move areas of the respective optical filters are within the move areas of the respective aperture diaphragms. Accordingly, the vertical size of the device may be limited to the space where the respective aperture diaphragms move, as a consequence, it is possible to achieve a compact size of the device.

Figure 4:
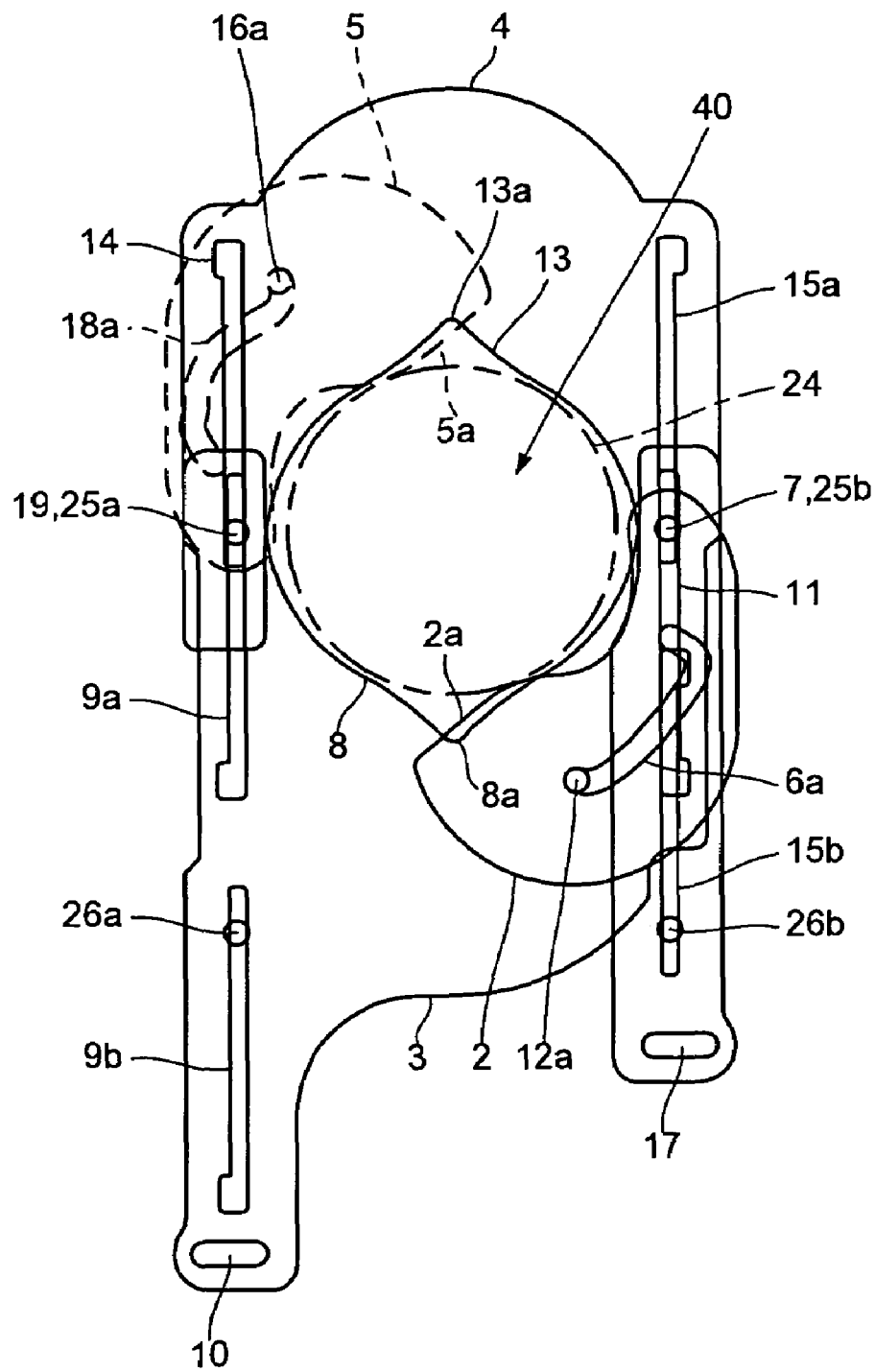
FIG. 4 is a front view of the light-amount adjusting apparatus according to a second embodiment of the present invention.

FIG. 4 is a front view of the light-amount adjusting apparatus according to a second embodiment of the present invention. An example of a structure of a light-amount adjusting apparatus where upper and lower optical filters are driven asymmetrically is shown in the figure. The shapes of a lower aperture diaphragm 3 and an upper aperture diaphragm 4 are same as those in the structure according to the first embodiment. A lower optical filter 2 and an upper optical filter of a same shape are arranged in vertically symmetrical manners. However, the shapes of a cam hole 6a formed in the lower optical filter 2 is different from that of a cam hole 18a formed in the upper optical filter 5. The cam hole 6a formed in the lower optical filter 2 is formed into a roughly J shape, meanwhile, the cam hole 18a formed in the upper optical filter 5 is formed into a roughly S shape.

A maximum aperture condition (aperture release) is shown in the figure. In this condition, the lower optical filter 2 and the upper optical filter 5 are outside of a light pass hole 24, and light that is guided to an imaging element (not illustrated) to be arranged at the rear of the device is free of influence by the lower optical filter 2 and the upper optical filter 5.

Figure 5A:
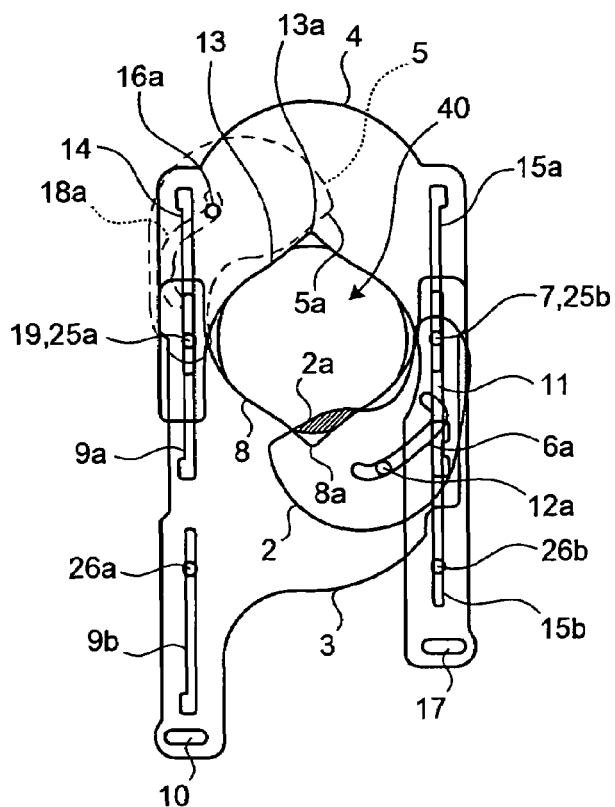
FIGS. 5A to 5D are series of action figures for explaining the aperture actions of the light-amount adjusting apparatus according to the second embodiment.

FIGS. 5A to 5D show action figures for explaining the aperture actions of the light-amount adjusting apparatus according to the second embodiment. FIG. 5A is a condition where the aperture is a bit stopped down from the maximum aperture condition shown in FIG. 4. In this condition, the lower aperture diaphragm 3 and the upper aperture diaphragm 4 are moved, and the most lower end portion 8a of the opening forming portion 8 of the lower aperture diaphragm 3 and the most upper end portion 13a of the opening forming portion 13 of the upper aperture diaphragm 4 are positioned a bit inside from the edge of the light pass hole 24. At this moment, the driving shaft 12a is positioned in the diagonal portion of the cam hole 6a, therefore, the lower optical filter 2 goes partially into the light pass hole 24. On the other hand, the driving shaft 16a is positioned in the vertical portion of the cam hole 18a, therefore, the upper optical filter 5 does not get into the light pass hole 24 yet and is positioned outside thereof.

Figure 5B:
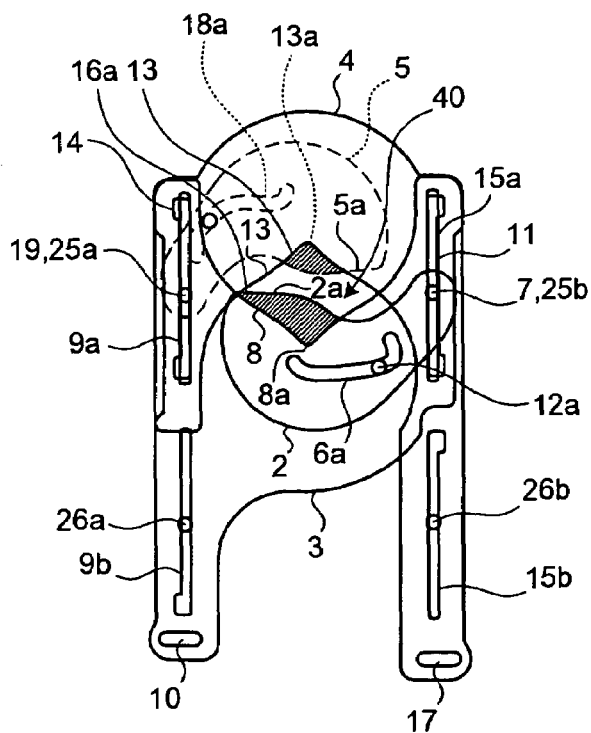

FIG. 5B is a middle aperture condition where the lower aperture diaphragm 3 and the upper aperture diaphragm 4 are moved further from the condition in FIG. 5A. In this condition, the lower optical filter 2 increases its advance amount into the light pass hole 24 according to move amount of the lower aperture diaphragm 3. Then, when the driving shaft 16a is positioned at the arc portion of the cam hole 18a, the upper optical filter 5 starts getting into the light pass hole 24. At this moment, parts of the lower optical filter 2 and the upper optical filter 5 cover about ½ of the inside of the roughly rhombic shape formed by the opening forming portions 8 and 13, and the remaining about ½ thereof lets light go through. In the condition shown in the figure, in comparison with the middle aperture condition shown in FIG. 3B, it is known that the advance portion to the light pass hole 24 is high at the lower optical filter 2, and low at the upper optical filter 5.

Figure 5C:
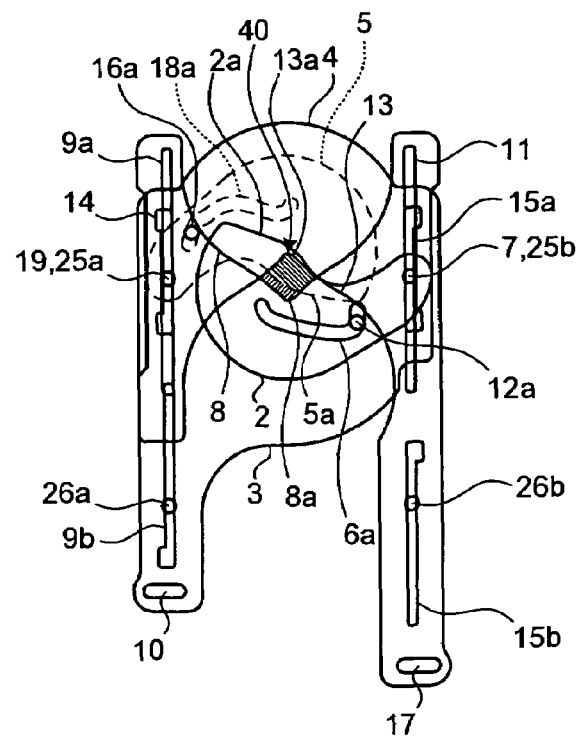

FIG. 5C is a condition where the lower aperture diaphragm 3 and the upper aperture diaphragm 4 are moved furthermore from the condition in FIG. 5B. In this condition, the roughly rhombic opening area 40 becomes further smaller, and the lower optical filter 2 and the upper optical filter 5 overlap in the opening area 40, and there is no portion where light goes through. However, the lower optical filter 2 and the upper optical filter 5 do not overlap in the entire area in the opening area 40, but in the opening area 40, a portion of only the upper optical filter 5 is formed, and a portion with different light transmittance is formed in the opening area 40. As shown in the figure, the light transmittance becomes low at the diagonally right rhombic portion of the opening area 40, and becomes high at the diagonally left rhombic portion.

Figure 5D:
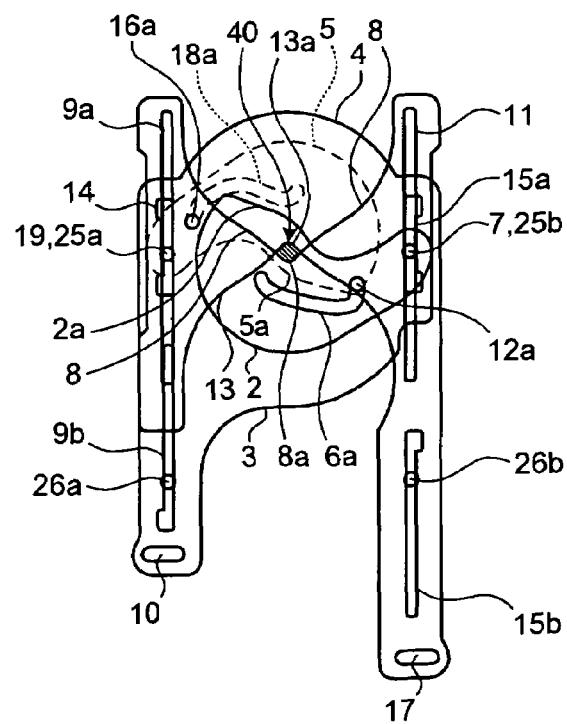

FIG. 5D is a figure showing the minimum aperture condition. In this condition, the opening area 40 is positioned at the center of the light pass hole 24, and becomes the smallest rhombic shape. In this condition, the lower optical filter 2 and the upper optical filter 5 overlap in all the area of the opening area 40, accordingly, the light transmittance in the size of the opening area 40 becomes lowest. This condition is made on assumption of the case where illuminance of an object is extremely high, and enables to restrict what is called "vignetting" on an image forming plane of an imaging element.

According to the second embodiment, only by making different the shapes of the cam holes to be formed in the upper optical filter 5 and the lower optical filter 2, it is possible to easily move the upper optical filter 5 and the lower optical filter 2 that move into the light pass hole 24 with mutually different move amounts, and in asymmetrical manners. By making asymmetrical the driving of the lower optical filter 2 and the upper optical filter 5, it is possible to further reduce harmful influences by flare that occurs owing to light reflection at optical filter end surface.

FIG. 6 is a disassembled perspective view showing the structure of a light-amount adjusting apparatus according to a third embodiment of the present invention. The light-amount adjusting apparatus according to the third embodiment includes an aperture holder 1, a lower driving diaphragm 30, a lower aperture diaphragm 3, an upper aperture diaphragm 4, an upper driving diaphragm 31, a driving motor 28, and a driving unit 29.

The aperture holder 1, the driving motor 28, and the driving unit 29 are same as those used in the device according to the first embodiment. Further, the lower aperture diaphragm 3 and the upper aperture diaphragm 4 are of the same structures as those used in the first embodiment, with exception that the portions where the driving shafts 12b and 16b are formed are different. The driving shaft 12b is formed at the left side by the most lower portion of the straight guide hole 11 of the lower aperture diaphragm 3. Meanwhile, the driving shaft 16b is formed at the right side by the most upper portion of the straight guide hole 14 of the upper aperture diaphragm 4.

The lower driving diaphragm 30 is made of a relatively thin film that blocks light, and to a dogleg shaped internal edge portion 30a by the end thereof, a roughly fan shaped optical filter (ND filter) 32 is attached. Further, in this lower driving diaphragm 30, a cam hole 6b that is cut out into a roughly S shape, and a rotation center hole 7 are formed.

The upper driving diaphragm 31 is made of a relatively thin film, and to a dogleg shaped internal edge portion 31a by the end thereof, a roughly fan shaped optical filter (ND filter) 33 is attached. Further, in this upper driving diaphragm 31, a cam hole 18b that is cut out into a roughly S shape, and a rotation center hole 19 are formed. By the way, this upper driving diaphragm 31 is of the same shape as that of the lower driving diaphragm 30. Further, the sizes, shapes, and formation positions of the cam hole 18b and the rotation center hole 19 are same as those of the cam hole 6b and the rotation center hole 7. The light transmittance of the optical filters 32 and 33 is same. As explained above, the structure of the third embodiment is a structure where optical filters (filter plates) of the shapes that correspond only to the portions of driving diaphragms that go into and out of the light pass hole 24 are arranged.

According to the third embodiment, from not illustrated object side (left side of the figure), the lower driving diaphragm 30 having the optical filter 32, the lower aperture diaphragm 3, the upper aperture diaphragm 4, and the upper driving diaphragm 31 having the optical filter 33 are arranged sequentially.

To the driving shaft 12b arranged on the lower aperture diaphragm 3, the cam hole 6b of the lower driving diaphragm 30 is engaged. To the driving shaft 16a arranged on the upper aperture diaphragm 4, the cam hole 18b of the upper driving diaphragm 31 is engaged. Then, to the rotating shaft 25a of the aperture holder 1, the rotation center hole 19 of the upper driving diaphragm 31 is engaged, further the straight guide hole 14 of the upper aperture diaphragm 4, and the straight guide hole 9a of the lower aperture diaphragm 3 are engaged thereto.

Further, to the rotating shaft 25b of the aperture holder 1, the straight guide hole 15a of the upper aperture diaphragm 4, and the straight guide hole 11 of the lower aperture diaphragm 3 are engaged, and further the rotation center hole 7 of the lower driving diaphragm 30 is engaged thereto. To the diaphragm guide pin 26a of the aperture holder 1, the straight guide hole 9b of the lower aperture diaphragm 3 is engaged. To the diaphragm guide pin 26b of the aperture holder 1, the straight guide hole 15b of the upper aperture diaphragm 4 is engaged. The lower driving diaphragm 30 and the upper driving diaphragm 31 are arranged point symmetrically to the center (light axis) of the light pass hole 24 of the aperture holder 1.

Further, from the rear side (image side) of the driving attaching portion 23, the driving motor 28 is attached to the driving motor attaching portion 27 arranged in the driving attaching portion 23. Then, the rotating shaft 28a of the driving motor 28 is attached to the rotation lever 20 of the driving unit 29. The left connection pin 22a and the right connection pin 22b arranged at both the ends of the arm 21 of the driving unit 29 are engaged to the rotation connection hole 10 of the lower aperture diaphragm 3 and the rotation connection hole 17 of the upper aperture diaphragm 4 respectively. The left connection pin 22a and the right connection pin 22b freely slide to the rotation connection hole 10 and the rotation connection hole 17 respectively.

When the driving motor 28 is driven (rotated), the arm 21 of the driving unit 29 swings. At this moment, the left connection pin 22a and the right connection pin 22b of the arm 21 move in mutually reverse vertical directions, thereby, the lower aperture diaphragm 3 and the upper aperture diaphragm 4 move in mutually reverse vertical directions. Accordingly, the lower driving diaphragm 30 and the upper driving diaphragm 31 respectively arranged to the shafts on the lower aperture diaphragm 3 and the upper aperture diaphragm 4 move in mutually reverse vertical directions, too.

The driving shaft 16b of the upper aperture diaphragm 4 slides in the cam hole 18b formed in the upper driving diaphragm 31, and the upper driving diaphragm 31 rotates around the rotation center hole 19. At the same time, the driving shaft 12b of the lower aperture diaphragm 3 slides in the cam hole 6b formed in the lower driving diaphragm 30, and the lower driving diaphragm 30 rotates around the rotation center hole 7. The lower driving diaphragm 30 and the upper driving diaphragm 31 rotate, while holding their point symmetrical conditions to the center of the light pass hole 24. Through these actions, the size of an opening area 40 to be formed of the light-amount adjusting apparatus changes as shown in FIGS. 8A to 8D to be explained later herein.

Figure 7:
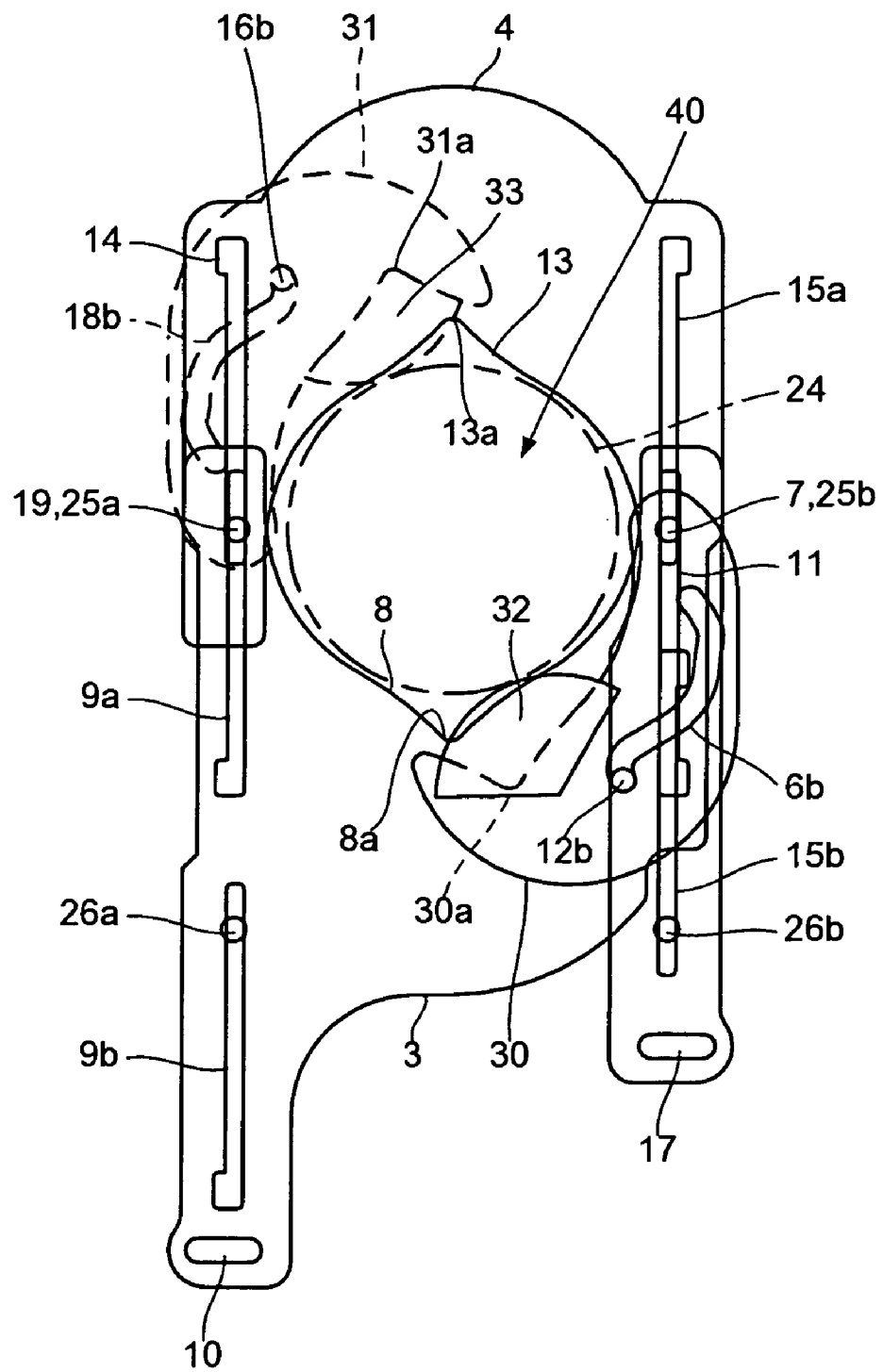
FIG. 7 is a front view of the light-amount adjusting apparatus according to a third embodiment of the present invention.

FIG. 7 is a front view of the light-amount adjusting apparatus according to the third embodiment. A maximum aperture condition is shown in the figure. At the moment of this maximum aperture, the left connection pin 22a of the arm 21 of the driving unit 29 shown in FIG. 6 is positioned diagonally downward, and the right connection pin 22b is positioned diagonally upward. Accordingly, the lower aperture diaphragm 3 is positioned at the lower end of the move range thereof, and the upper aperture diaphragm 4 is positioned at the upper end of the move range thereof.

The most lower end portion 8a of the opening forming portion 8 of the lower aperture diaphragm 3 and the most upper end portion 13a of the opening forming portion 13 of the upper aperture diaphragm 4, that are convex, are outside of the light pass hole 24 of the aperture holder 1. Further, at this maximum aperture, the lower driving diaphragm 30 and the upper driving diaphragm 31 are outside of the light pass hole 24. At the same time, the optical filter 32 arranged on the lower driving diaphragm 30 and the optical filter 33 arranged on the upper driving diaphragm 31 are also outside of the light pass hole 24.

Figure 8A:
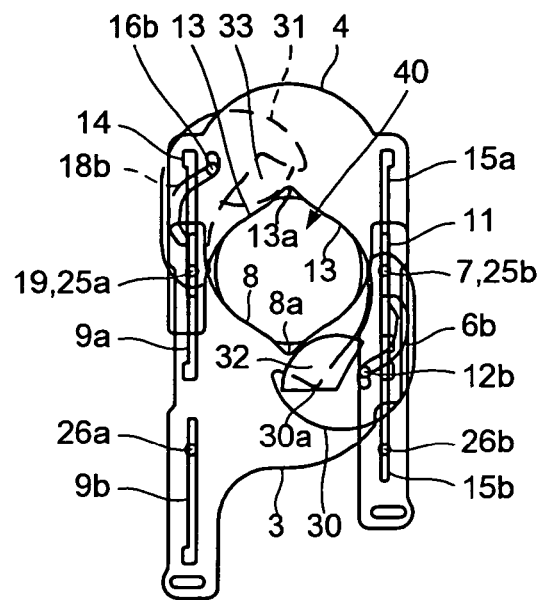
FIGS. 8A to 8D are series of action figures for explaining the aperture actions of the light-amount adjusting apparatus according to the third embodiment.

FIGS. 8A to 8D shows action figures for explaining the aperture actions of the light-amount adjusting apparatus according to the third embodiment. FIG. 8A is a condition where the aperture is a bit stopped down from the maximum aperture condition shown in FIG. 7. In this condition, the lower aperture diaphragm 3 and the upper aperture diaphragm 4 are moved, and the most lower end portion 8a of the opening forming portion 8 of the lower aperture diaphragm 3 and the most upper end portion 13a of the opening forming portion 13 of the upper aperture diaphragm 4 are positioned a bit inside from the edge of the light pass hole 24. And in this condition, the lower driving diaphragm 30 and the upper driving diaphragm 31, and the optical filters 32 and 33 arranged on these are positioned outside of the opening area 40 formed by the opening forming portion 8 of the lower aperture diaphragm 3 and the opening forming portion 13 of the upper aperture diaphragm 4. The cam hole 6b and 18b arranged in the lower driving diaphragm 30 and the upper driving diaphragm 31 are of a roughly S shape, and at this stage, the gum hole 6b and 18b are in the direction along the direction where the lower aperture diaphragm 3 and the upper aperture diaphragm 4 move vertically, accordingly, the lower driving diaphragm 30 and the upper driving diaphragm 31 remain at the position shown in FIG. 7 and do not move.

Figure 8B:
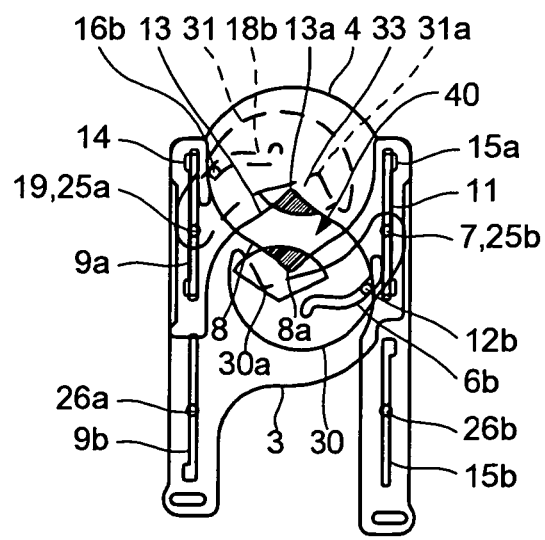

FIG. 8B is a middle aperture condition where the lower aperture diaphragm 3 and the upper aperture diaphragm 4 are moved further from the condition in FIG. 8A. The opening area 40 formed by the opening forming portion 8 of the lower aperture diaphragm 3 and the opening forming portion 13 of the upper aperture diaphragm 4 becomes a roughly rhombic shape. In this condition, the opening area 40 is positioned inside of the light pass hole 24. And in this condition, parts of the optical filters 32 and 33 get into the opening area 40 by specified amount. By the way, in the opening area 40, between the two optical filters 32 and 33, roughly hexagonal space where light goes through is formed.

Figure 8C:
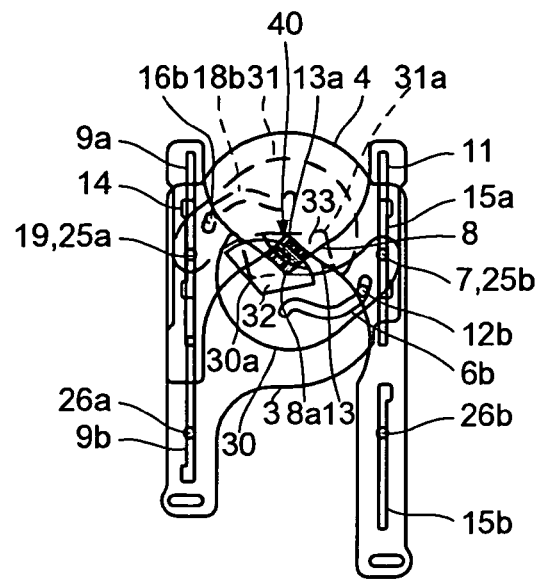

FIG. 8C is a condition where the lower aperture diaphragm 3 and the upper aperture diaphragm 4 are moved furthermore from the condition in FIG. 8B. The opening area 40 of a roughly rhombic shape formed by the opening forming portion 8 of the lower aperture diaphragm 3 and the opening forming portion 13 of the upper aperture diaphragm 4 in the area of the light pass hole 24 becomes further smaller. In this condition, in the opening area 40, the optical filter 32 of the lower driving diaphragm 30 and the optical filter 33 of the upper driving diaphragm 31 overlap, and there is no portion where light goes through. However, the two optical filters do not overlap in the entire area in the opening area 40, accordingly, a portion with different light transmittance is formed in the opening area 40. In the example shown in the figure, the two optical filters overlap near the center of the opening area 40 and the light transmittance becomes lowest therein, meanwhile only one of the optical filters exists at the peripheral portion thereof (right top and left bottom portions), and the light transmittance becomes higher therein than at the center.

Figure 8D:
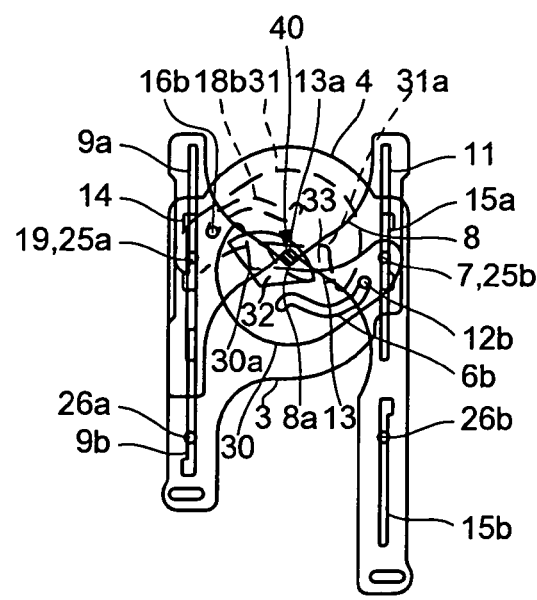

FIG. 8D is a figure showing the minimum aperture condition. In this condition, the left connection pin 22a of the arm 21 of the driving unit 29 shown in FIG. 6 is positioned diagonally upward, and the right connection pin 22b is positioned diagonally downward. Accordingly, the lower aperture diaphragm 3 is positioned at the upper end of the move range thereof, and the upper aperture diaphragm 4 is positioned at the lower end of the move range thereof. In this condition, the opening area 40 becomes a small rhombic shape positioned near the center of the light pass hole 24. In this condition, the optical filter 32 and the optical filter 33 overlap in all the area of the opening area 40, accordingly, the light transmittance to the size of the opening area 40 becomes lowest. This condition is made on assumption of the case where illuminance of an object is extremely high, and enables to restrict what is called "vignetting" on an image forming plane of an imaging element.

According to the third embodiment, in the maximum aperture condition, parts of the optical filters do not get into the light pass hole 24, as a result, it is possible to secure sufficient light amount. Further, in this device, the lower driving diaphragm 30 and the upper driving diaphragm 31 having the optical filters 32 and 33 respectively rotate while holding their point symmetrical relation to the light axis, and the move amounts of the optical filters 32 and 33 in the opening area 40 become quantitative, as a result, it is possible to easily control light amount passing the light pass hole 24.

Furthermore according to the third embodiment, toward the minimum aperture condition, the portion of the area where the two optical filters overlap increases. Accordingly, it is possible to restrict shading that occurs especially from the middle aperture condition to the minimum aperture condition.

Moreover, according to the third embodiment, driving diaphragms having optical filters are driven in connection with aperture diaphragms, as a result, only one unit of driving motor will do well as the power source for driving them. Accordingly, it is possible to make smallest the space for arranging the power source. Further, move areas of the driving diaphragms having the respective optical filters are within the move areas of the respective aperture diaphragms. Accordingly, the vertical size of the device may be limited to the space where the respective aperture diaphragms move, as a consequence, it is possible to achieve a compact size of the device. By the way, it is needless to say that in the third embodiment, too, in the same manner as explained in the second embodiment, by making different the shapes of the cam holes formed in the lower driving diaphragm 30 and the upper driving diaphragm 31, it is possible to drive the optical filters 32 and 33 in asymmetrical manners.

Figure 9:
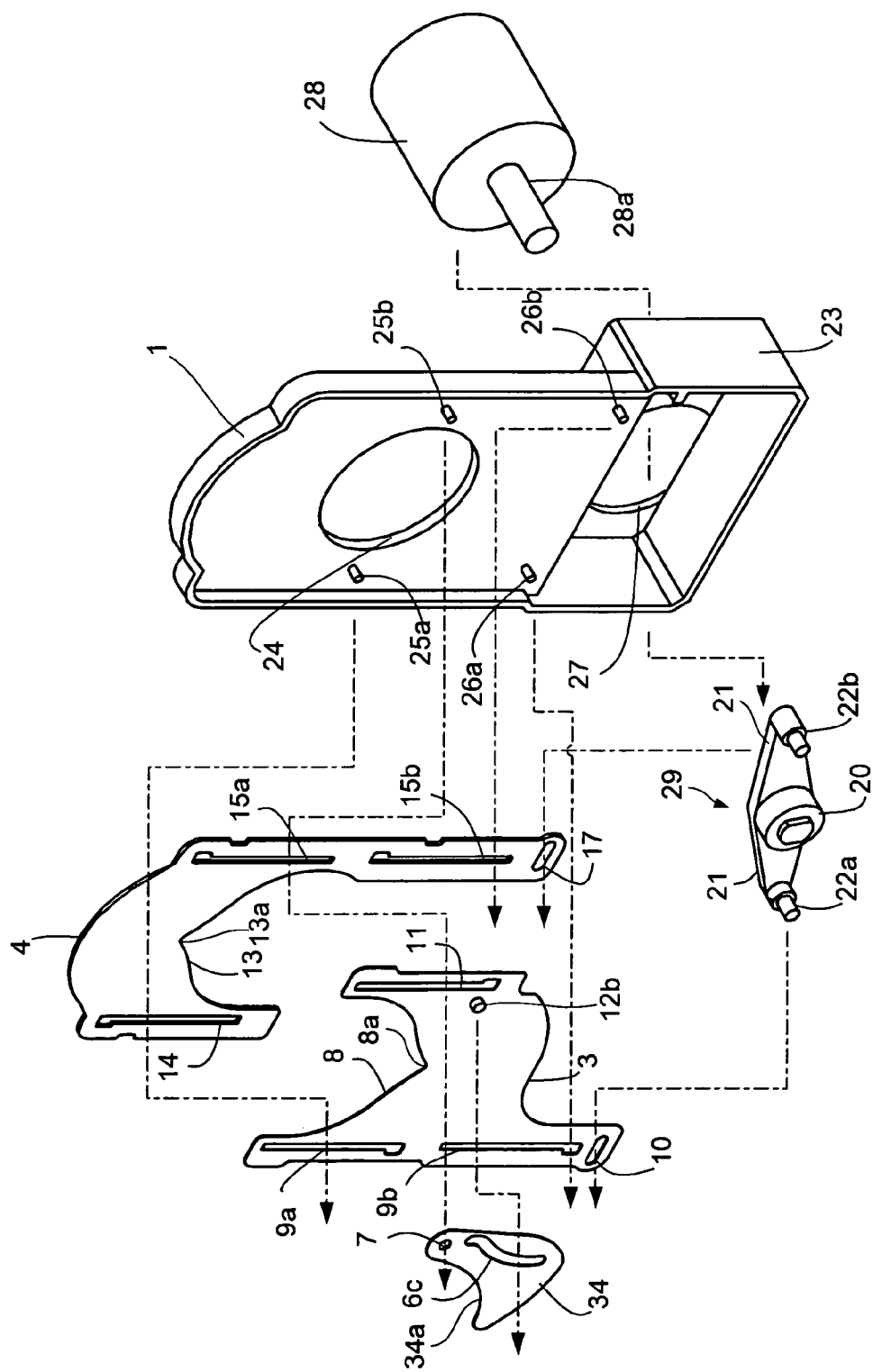
FIG. 9 is a disassembled perspective view showing the structure of a light-amount adjusting apparatus according to a fourth embodiment of the present invention.

A fourth embodiment of the present invention shows an example of a light-amount adjusting apparatus having an optical filter (infrared cut filter). FIG. 9 is a disassembled perspective view showing the structure of a light-amount adjusting apparatus according to the fourth embodiment. The light-amount adjusting apparatus according to the fourth embodiment includes an aperture holder 1, an optical filter 34, a lower aperture diaphragm 3, an upper aperture diaphragm 4, a driving motor 28, and a driving unit 29.

The aperture holder 1, the driving motor 28, and the driving unit 29 are same as those used in the previously described respective embodiments. The lower aperture diaphragm 3 is same as one used in the device according to the third embodiment. Further, the upper aperture diaphragm 4 is of the same structure as those used in the previous respective embodiments, with exception that any driving shaft is not formed therein.

The optical filter 34 is made of a relatively thin film, and has a function as a NIR (near infrared) cut filter. This optical filter 34 is of a roughly bow shape, and has an inner edge portion 34a that roughly meets the shape of the light pass hole 24. Further, in this optical filter 34, a cam hole 6c that is cut out into a roughly arc shape, and a rotation center hole 7 are formed. The cam hole 6c is formed so as to have a relative small vertical interval of both the ends (horizontal direction in the figure).

In the light-amount adjusting apparatus according to the fourth embodiment, from not illustrated object side (left side of the figure), the optical filter 34, the lower aperture diaphragm 3, and the upper aperture diaphragm 4 are arranged sequentially. First, to the driving shaft 12b arranged on the lower aperture diaphragm 3, the cam hole 6c of the optical filter 34 is engaged.

Then, to the rotating shaft 25a of the aperture holder 1, the straight guide hole 14 of the upper aperture diaphragm 4 and the straight guide hole 9a of the lower aperture diaphragm 3 are engaged. Further, to the rotating shaft 25b of the aperture holder 1, the straight guide hole 15a of the upper aperture diaphragm 4, and the straight guide hole 11 of the lower aperture diaphragm 3 are engaged, and further, the rotation center hole 7 of the optical filter 34 is engaged thereto. To the diaphragm guide pin 26a of the aperture holder 1, the straight guide hole 9b of the lower aperture diaphragm 3 is engaged. To the diaphragm guide pin 26b of the aperture holder 1, the straight guide hole 15b of the upper aperture diaphragm 4 is engaged.

Further, from the rear side (image side) of the driving attaching portion 23, the driving motor 28 is attached to the driving motor attaching portion 27 arranged in the driving attaching portion 23. Then, the rotating shaft 28a of the driving motor 28 is attached to the rotation lever 20 of the driving unit 29. The left connection pin 22a and the right connection pin 22b arranged at both the ends of the arm 21 of the driving unit 29 are engaged to the rotation connection hole 10 of the lower aperture diaphragm 3 and the rotation connection hole 17 of the upper aperture diaphragm 4 respectively. The left connection pin 22a and the right connection pin 22b freely slide to the rotation connection hole 10 and the rotation connection hole 17 respectively.

When the driving motor 28 is driven (rotated), the arm 21 of the driving unit 29 swings. At this moment, the left connection pin 22*a* and the right connection pin 22*b* of the arm 21 move in mutually reverse vertical directions, thereby, the lower aperture diaphragm 3 and the upper aperture diaphragm 4 move in mutually reverse vertical directions. Accordingly, the optical filter 34 moves in vertical direction, too. As a result, the driving shaft 12*b* of the lower aperture diaphragm 3 slides in the cam hole 6*c* formed in the optical filter 34, and the optical filter 34 rotates around the rotation center hole 7. Through these actions, the size of an opening area 40 of the light-amount adjusting apparatus according to the fourth embodiment changes as shown in FIG. 11 to be explained later herein.

Figure 10:
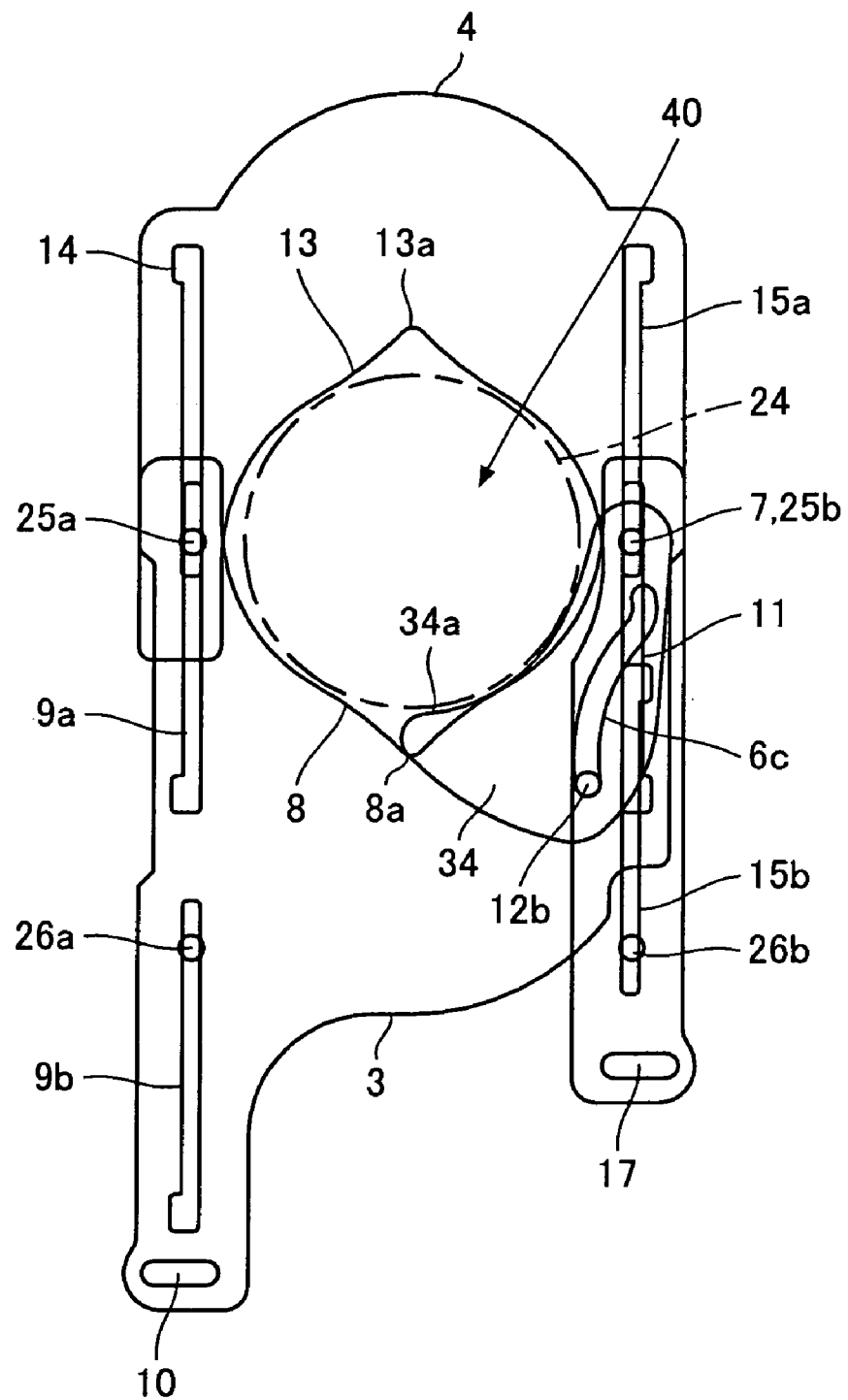
FIG. 10 is a front view of the light-amount adjusting apparatus according to the fourth embodiment.

FIG. 10 is a front view of the light-amount adjusting apparatus according to the fourth embodiment. A maximum aperture condition (aperture release) is shown in the figure. At the moment of this maximum aperture, the left connection pin 22*a* of the arm 21 of the driving unit 29 shown in FIG. 9 is positioned diagonally downward, and the right connection pin 22*b* is positioned diagonally upward. Accordingly, the lower aperture diaphragm 3 is positioned at the lower end of the move range thereof, and the upper aperture diaphragm 4 is positioned at the upper end of the move range thereof.

The most lower end portion 8*a* of the opening forming portion 8 of the lower aperture diaphragm 3 and the most upper end portion 13*a* of the opening forming portion 13 of the upper aperture diaphragm 4, that are convex, are positioned outside of the light pass hole 24 of the aperture holder 1. And at this maximum aperture, the optical filter 34 is positioned outside of the light pass hole 24.

Figure 11A:
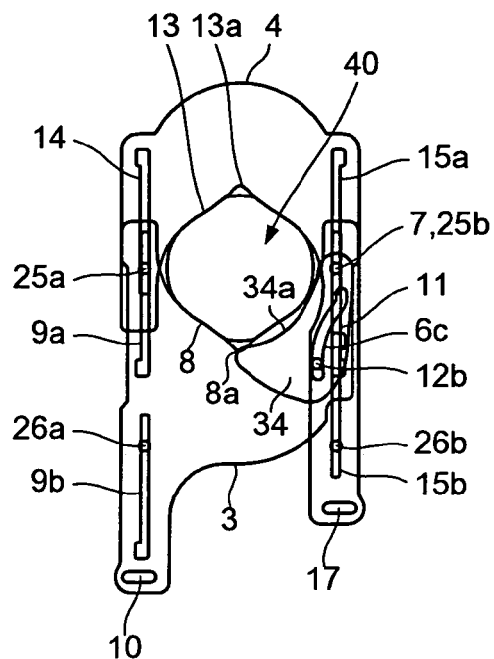
FIGS. 11A to 11D are series of action figures for explaining the aperture actions of the light-amount adjusting apparatus according to the fourth embodiment.

FIGS. 11A to 11D show action figures for explaining the aperture actions of the light-amount adjusting apparatus according to the fourth embodiment. FIG. 11A is a condition where the aperture is a bit stopped down from the maximum aperture condition shown in FIG. 10. In this condition, the lower aperture diaphragm 3 and the upper aperture diaphragm 4 are moved, and the most lower end portion 8*a* of the opening forming portion 8 of the lower aperture diaphragm 3 and the most upper end portion 13*a* of the opening forming portion 13 of the upper aperture diaphragm 4 are positioned a bit inside from the edge of the light pass hole 24. Further, the optical filter 34 is positioned outside of the opening area 40 formed by the opening forming portion 8 of the lower aperture diaphragm 3 and the opening forming portion 13 of the upper aperture diaphragm 4. Namely, because the engaging cam hole 6*c* is faced in nearly vertical direction, the driving shaft 12*b* moves in nearly vertical direction in this cam hole 6*c*, accordingly the optical filter 34 is in a status where its move amount toward the light pass hole 24 is small.

Figure 11B:
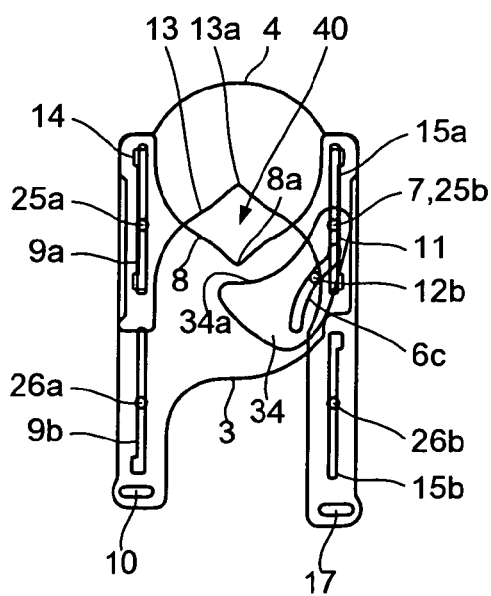

FIG. 11B is a middle aperture condition where the lower aperture diaphragm 3 and the upper aperture diaphragm 4 are moved further from the condition in FIG. 11A. The opening area 40 formed by the opening forming portion 8 of the lower aperture diaphragm 3 and the opening forming portion 13 of the upper aperture diaphragm 4 becomes a roughly rhombic shape. In this condition, the opening area 40 is positioned inside of the light pass hole 24. And in this condition, too, the optical filter 34 is still positioned outside of the opening area 40.

Figure 11C:
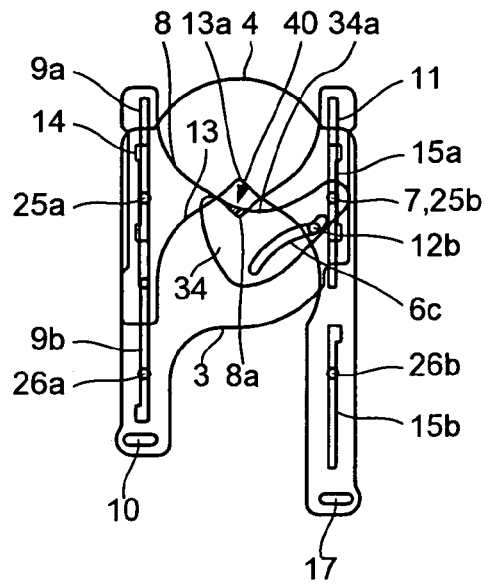

FIG. 11C is a condition where the lower aperture diaphragm 3 and the upper aperture diaphragm 4 are moved furthermore from the condition in FIG. 11B. The roughly rhombic shape (opening area 40) formed by the opening forming portion 8 of the lower aperture diaphragm 3 and the opening forming portion 13 of the upper aperture diaphragm 4 in the area of the light pass hole 24 becomes further smaller.

In this condition, by the move of the driving shaft 12*b* in the cam hole 6*c*, part (inner edge portion 34*a*) of the optical filter 34 gets into the opening area 40. In other portions of the opening area 40, light goes through.

Figure 11D:
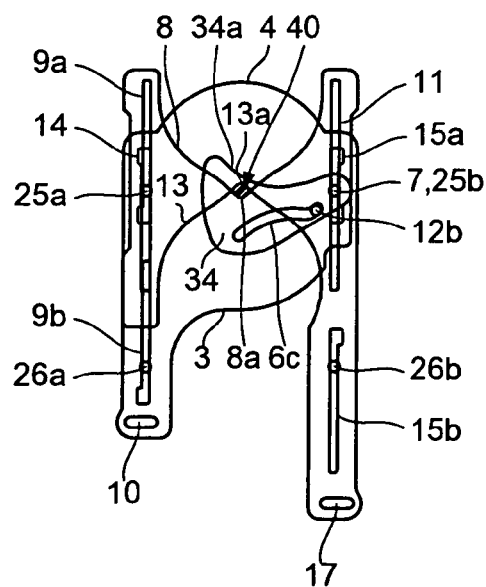

FIG. 11D is a figure showing the minimum aperture condition. At this moment, the left connection pin 22*a* of the arm 21 of the driving unit 29 shown in FIG. 9 is positioned diagonally upward, and the right connection pin 22*b* is positioned diagonally downward. Accordingly, the lower aperture diaphragm 3 is positioned at the upper end of the move range thereof, and the upper aperture diaphragm 4 is positioned at the lower end of the move range thereof. In this condition, the opening area 40 becomes a small rhombic shape positioned near the center of the light pass hole 24. In this condition, the optical filter 34 covers the entire area of the opening area 40.

According to the fourth embodiment, in the maximum aperture condition, part of the optical filter 34 do not get into the light pass hole 24, as a result, it is possible to secure sufficient light amount. Further, the optical filter 34 is driven in connection with the lower aperture diaphragm 3, as a result, only one unit of driving motor will do well as the power source for driving them. Accordingly, it is possible to make smallest the space for arranging the power source. Further, move areas of the optical filter 34 is within the move areas of the lower aperture diaphragm 3. Accordingly, the vertical size of the device may be limited to the space where the lower aperture diaphragm 3 moves, as a consequence, it is possible to achieve a compact size of the device.

Furthermore, when an infrared cut filter is used as an optical filter, by making this infrared cut filter going into the light pass hole 24 near the minimum aperture, it becomes possible to effectively cut infrared light. According to the above structure, it becomes possible to get in and out this infrared cut filter with a simple structure.

According to the respective embodiments, actions from the maximum aperture to the minimum aperture have been explained, and structures where optical filters go into the light pass hole have been explained, on the contrary, actions from the minimum aperture to the maximum aperture are just reverse actions, therefore, explanations thereof are omitted herein. In this instance, optical filters shift from the condition where they get into the light pass hole into the condition where they get out from the light pass hole. Further, the present invention is not limited to the respective embodiment herein, but the present invention may be embodied in other specific forms without departing from the spirit or essential characteristics thereof. For example, each optical filter or driving diaphragm are structured so as to rotate by forming a cam hole therein, however, other means than a cam hole may be selected so long as each optical filter or driving diaphragm may rotate.

According to the present invention, it is possible to continuously change the portion that an optical filter occupies to the size of a changing aperture opening. Especially, it is possible to appropriately set the advance and retreat amount of an optical filter from the middle aperture to the minimum aperture, and to restrict shading.

Furthermore, according to the present invention, it is possible to obtain the above effects with a compact size of the device. Furthermore, in the maximum aperture condition, part of an optical filter does not go into the light pass hole, as a consequence, it is possible to secure sufficient light amount.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Japanese Patent Application 2002-371093, filed Dec. 20, 2002, is incorporated herein by reference in its entirety.

What is claimed is:

1. A light-amount adjusting apparatus comprising:
two aperture diaphragms that move in such a direction that the two aperture diaphragms come close or get away with respect to an optical axis of an incident light to adjust a size of an aperture opening; and
a holding unit that holds the aperture diaphragms,
wherein at least one of the two aperture diaphragms includes an optical filter having a predetermined light transmittance characteristic,
wherein the optical filter freely advances and retreats in a direction of the aperture opening in conjunction with a movement of the aperture diaphragm which has the optical filter,
wherein the holding unit includes rotating shafts that guide the aperture diaphragms,
wherein each aperture diaphragm includes guide holes that are engaged with the rotating shafts, and
wherein the optical filter includes a rotation center hole that is engaged with one of the rotating shafts so that the optical filter rotates about the one of the rotating shafts.

2. The light-amount adjusting apparatus according to claim 1, wherein the optical filter includes:
a driving diaphragm that is attached to one of the aperture diaphragms, and includes a notched portion that advances to and retreats from the aperture opening; and
a filter plate that is attached to the notched portion of the driving diaphragm, faces the aperture opening, and has the predetermined light transmittance characteristic.

3. The light-amount adjusting apparatus according to claim 1, further comprising:
a cam hole formed in the optical filter; and
a driving shaft that is arranged in one of the aperture diaphragms, and is engaged with the cam hole.

4. The light-amount adjusting apparatus according to claim 1, wherein the optical filter includes two sheets of filters arranged in a point-symmetrical manner, and wherein the two sheets of filters freely advance and retreat in the direction of the aperture opening while maintaining a point-symmetrical relation.

5. The light-amount adjusting apparatus according to claim 1, wherein the optical filter includes two sheets of filters arranged in a point-symmetrical manner with respect to the optical axis, and wherein the two sheets of filters have a point-symmetrical relation and an asymmetrical relation while advancing and retreating in the direction of the aperture opening.

6. The light-amount adjusting apparatus according to claim 5, further comprising:
a cam hole formed in each of the two sheets of filters; and
a driving shaft that is arranged in one of the aperture diaphragms, and is engaged with the respective cam hole of one of the two sheets,
wherein the two sheets of filters have a different shape for their respective cam hole with respect to each other.

7. The light-amount adjusting apparatus according to claim 6, wherein the shapes of the cam holes are formed in such a manner that the two sheets of filters have the point-symmetrical manner at a position where the driving shaft is engaged with the respective cam hole of the one of the two sheets at a moment of a maximum aperture opening.

8. The light-amount adjusting apparatus according to claim 6, wherein the shapes of the cam holes are formed in such a manner that one of the two sheets of filters goes into an aperture opening area behind the other of the two sheets of filters while advancing and retreating in the direction of the aperture opening.

9. The light-amount adjusting apparatus according to claim 8, wherein the shapes of the cam holes are formed in such a manner that an angle of a shape of the respective cam hole of the one of the two sheets to which the driving shaft is engaged from a maximum aperture opening to an aperture size reduced by a predetermined amount is different with respect to the direction of the movement of the aperture diaphragm by which the optical filter is supported.

10. The light-amount adjusting apparatus according to claim 9, wherein from among the shapes of the cam holes formed in the two sheets of filters, the shape of the respective cam hole of the one of the two sheets to which the driving shaft is engaged from a maximum aperture opening to an aperture size reduced by a predetermined amount is formed in a substantially horizontal direction with respect to the direction of the movement of the aperture diaphragm by which the optical filter is supported.

11. The light-amount adjusting apparatus according to claim 1, wherein the optical filter has such a shape that the optical filter can advance and retreat within a range of the movement of one of the aperture diaphragms.

12. The light-amount adjusting apparatus according to claim 1, wherein the optical filter forms an inner edge portion that substantially matches with a diameter of a light pass hole.

13. The light-amount adjusting apparatus according to claim 4, wherein the two sheets of filters are overlapped with each other in a part or an entire area of the aperture opening of which a size is changed.

14. The light-amount adjusting apparatus according to claim 5, wherein the two sheets of filters are overlapped with each other in a part or whole of an area of the aperture opening of which a size is changed.

15. The light-amount adjusting apparatus according to claim 4, wherein a light transmittance in a portion where the two sheets of filters are overlapped is lower than a light transmittance in a portion where the two sheets of filters are not overlapped in an area of the aperture opening.

16. The light-amount adjusting apparatus according to claim 5, wherein a light transmittance in the portion where the two sheets of filters are overlapped is lower than a light transmittance in the portion where the two sheets of filters are not overlapped in an the area of the aperture opening.

17. The light-amount adjusting apparatus according to claim 4, further comprising a cam hole formed in each of the two sheets of filters,
wherein shapes of the cam holes are formed in such a manner that a portion where the two sheets of filters are overlapped in the aperture opening is increased as the aperture opening becomes closer to a status of a minimum aperture.

18. The light-amount adjusting apparatus according to claim 5, further comprising a cam hole formed in each of the two sheets of filters,
wherein shapes of the cam holes are formed in such a manner that a portion where the two sheets of filters are overlapped in the aperture opening is increased as the aperture opening becomes closer to a status of a minimum aperture.

19. The light-amount adjusting apparatus according to claim 4, further comprising a cam hole formed in each of the two sheets of filters, wherein shapes of the cam holes are formed in such a manner that the two sheets of filters are overlapped in an entire area of a minimum aperture opening.

20. The light-amount adjusting apparatus according to claim 5, further comprising a cam hole formed in each of the two sheets of filters,
wherein shapes of the cam holes are formed in such a manner that the two sheets of filters are overlapped in an entire area of a minimum aperture opening.

21. The light-amount adjusting apparatus according to claim 4, further comprising a cam hole formed in each of the two sheets of filters,
wherein shapes of the cam holes in such a manner that the optical filter retreats to an outside of the aperture opening at a status of a maximum aperture opening.

22. The light-amount adjusting apparatus according to claim 5, further comprising a cam hole formed in each of the two sheets of filters,
wherein shapes of the cam holes are formed in such a manner that the optical filter retreats to an outside of the aperture opening at a status of a maximum aperture opening.

23. The light-amount adjusting apparatus according to claim 1, wherein the aperture diaphragms include:
an opening forming portion formed in a substantially semi circular shape of which a size is substantially same as a diameter of a light pass hole; and
a notched portion formed near a center of a vertical direction of the opening forming portion, and
in all states of the aperture opening, a part of the optical filter covers a part or an entire area of the notched portion.

24. The light-amount adjusting apparatus according to claim 1, further comprising a driving unit for driving the optical filter and the aperture diaphragms.

25. The light-amount adjusting apparatus according to claim 1, wherein the optical filter is a neutral density filter.

26. The light-amount adjusting apparatus according to claim 1, wherein the optical filter is a near infrared cut filter.

27. A light-amount adjusting apparatus comprising:
two aperture diaphragms that move in such a direction that the two aperture diaphragms come close or get away with respect to an optical axis of an incident light to adjust a size of an aperture opening;
a moving unit that moves the aperture diaphragms; and
an optical filter that freely advances and retreats in a direction of the aperture opening in conjunction with a movement of the aperture diaphragms by the moving unit, and has a predetermined light transmittance in the direction of the aperture opening,
wherein the moving unit includes a rotating shaft that supports the aperture diaphragms and a driving shaft that is engaged with a cam hole formed in the optical filter, the optical filter being supported by the rotating shaft rotatably around the rotating shaft.

28. The light-amount adjusting apparatus according to claim 27, wherein the rotating shaft supports the aperture diaphragms slidably, and supports the optical filter at a fixed position on one of the aperture diaphragms rotatably.

29. The light-amount adjusting apparatus according to claim 28, wherein the rotating shaft is arranged in a holding unit that holds the aperture diaphragms in such a manner that the aperture diaphragms can move in the direction to come close or get away with respect to the optical axis of the incident light,
wherein the driving shaft is arranged on at least one of the aperture diaphragms, and
wherein the optical filter rotates around the rotating shaft in conjunction with the movement of at least one of the aperture diaphragms, and freely advances and retreats in the direction of the aperture opening.

* * * * *